(12) United States Patent
Kin et al.

(10) Patent No.: US 7,118,665 B2
(45) Date of Patent: Oct. 10, 2006

(54) SURFACE TREATMENT PROCESS FOR ENHANCING A RELEASE RATE OF METAL IONS FROM A SACRIFICIAL ELECTRODE AND A RELATED SACRIFICIAL ELECTRODE

(75) Inventors: Kon-Tsu Kin, Hsinchu (TW);
Hong-Shiang Tang, Hsinchu (TW);
Shu-Fei Chan, Hsinchu (TW);
Wen-Tsang Chen, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 464 days.

(21) Appl. No.: 10/788,382

(22) Filed: Mar. 1, 2004

(65) Prior Publication Data

US 2005/0126918 A1    Jun. 16, 2005

(30) Foreign Application Priority Data

Dec. 11, 2003    (TW) .............................. 92135096 A

(51) Int. Cl.
*C25D 5/34* (2006.01)
*C25D 5/48* (2006.01)

(52) U.S. Cl. ...................... 205/134; 205/350; 204/284; 204/292; 427/98.8; 427/243; 427/247

(58) Field of Classification Search ................ 204/284, 204/292; 205/134, 350; 427/98.8, 243, 427/247
See application file for complete search history.

(56) References Cited

U.S. PATENT DOCUMENTS 4,040,863 A * 8/1977 Kitamura ....................... 134/3
2002/0056702 A1 * 5/2002 Bishop et al. ................ 216/90

* cited by examiner

*Primary Examiner*—Bruce F. Bell
(74) *Attorney, Agent, or Firm*—Bacon & Thomas

(57) ABSTRACT

The present invention discloses a surface treatment process for enhancing both the release rate of metal ions from a sacrificial electrode, and the working life of the electrode. A high density of micro pores are formed on the surface of the sacrificial electrode. Chlorine ions are then implanted into the pores. The chlorine ions prevent a passive film from forming on the sacrificial electrode during use, in which an electric current flows through the sacrificial electrode.

19 Claims, 3 Drawing Sheets

SURFACE TREATMENT PROCESS FOR ENHANCING A RELEASE RATE OF METAL IONS FROM A SACRIFICIAL ELECTRODE AND A RELATED SACRIFICIAL ELECTRODE

BACKGROUND OF THE INVENTION

1. Field of the Invention

The present invention relates to a surface treatment process for enhancing the release rate of metal ions from a sacrificial electrode, and more particularly, to a surface treatment process for enhancing the release rate of iron ions from an iron electrode. The sacrificial electrode is commonly used as an anode in electroplating and for electro-coagulation devices.

2. Description of the Related Art

Electrodes are the most important elements in electro-chemical reactions, and their reactivity is of critical importance for process reaction rates. With regards to many related prior art technologies, most emphasize how to avoid corrosion of the electrode to extend the electrode's lifetime and its measurement accuracy. However, for a sacrificial electrode (as is used, for example, in an electro-coagulation device, which employs the sacrificial electrode to generate iron and aluminum irons for forming iron hydroxide and aluminum flocculation in a water processing device for), the primary concerns involve preventing the electrode from generating a passive film, improving the electrode corrosion rate, and uniformity of etching. The sacrificial electrode corrosion rate determines a release rate of metal ions and the reactivity of the sacrificial electrode. When a passive film is generated on the electrode, the reactivity of the electrode is reduced, which leads to excessive power consumption. Moreover, uneven corrosion generates pits and cracks in the electrode, reducing the electrode's lifetime.

The generation of such passive films is the primary reason for electrode inactivity. The passive layer is an insoluble oxide layer or organic layer that adheres to the surface of the electrode. The passive layer is very easily formed, and may have many different compositions.

Taking an iron electrode as an example, when the iron electrode is placed in a water solution, a FeOOH passive layer forms on the iron electrode, which has very low solubility, and so the iron ion release rate of the iron sacrificial electrode is reduced. As another example, consider the electro-coagulation process for waste water of a semiconductor chemical mechanical polishing process, which utilizes many different components for the polishing formula. Some of these chemical components may cause the electrode to generate a passive layer. Consequently, how to remove the passive layer, or prevent the formation of such a passive layer, is very important.

Most of the prior art electrode surface treatment processes focus only on how to prevent the corrosion of the electrode.

Therefore, it is desirable to provide a surface treatment process for enhancing the release rate of metal ions from a sacrificial electrode to mitigate and/or obviate the aforementioned problems.

SUMMARY OF THE INVENTION

A main objective of the present invention is to provide a surface treatment process for a sacrificial electrode, which prevents the electrode from generating a passive film, and which enhances the release rate of metal ions from the electrode, so as to extend the lifetime of the electrode.

Another objective of the present invention is to provide a sacrificial electrode with an enhanced release rate of metal ions to extend the lifetime of the electrode.

To achieve these objectives, the present invention method involves:

a) performing a surface pore formation process to form a high density distribution of micro pores on a surface of a metal electrode, wherein the metal electrode is an iron, aluminum or copper electrode; and b) implanting chlorine, bromine or iodine ions in the micro pores of the metal electrode.

In step a), the micro pores openings smaller than 20 microns, and a density distribution of at least $10^4$ pores per square centimeter.

The chlorine ion implantation includes immersing the electrode with pores formed in step a) into a solution containing chlorine ions, immersing the electrode with pores formed in step a) into a solution containing chlorine ions, and connecting the electrode to a cathode of a DC power source, and connecting a working electrode immersed in the solution to an anode of the DC power source. The solution containing chlorine ions further contains sodium chloride, potassium chloride or ammonium chloride.

The chlorine ion implantation is performed by a physical method, for example, exposing the electrode formed in step a) to chlorine or to a gas containing chlorine ions.

The surface pore formation process comprises a chemical etching process. The chemical etching process comprises connecting the electrode to a cathode of a DC power source, and connecting a working electrode immersed in the strong acid solution to an anode of the DC power source. The strong acid solution is 0.1–6M hydrochloric acid solution, such as 3M hydrochloric or a sulfuric acid solution 0.1–6M. The DC power source has a voltage of 1 to 50 volts between the cathode and the anode.

The chlorine ion implantation process is performed by a physical method. The physical etching process can be a plasma etching process.

The method of the present invention further comprises: performing a planarization process on the metal electrode before step a), the planarization process improving a surface planarity of the electrode; and rinsing particles remaining on the electrode surface after the planarization process.

The present invention also provides an iron sacrificial electrode comprises: an electrode surface; a plurality of pores disposed on the electrode surface; and chlorine ions implanted in the plurality of pores; wherein the pores have openings that are less than 20 microns in size, and the pores have a density distribution of at least $10^4$ pores per square centimeter.

In a preferred embodiment of the present invention, an iron sacrificial electrode is treated by the method of the present invention. An iron ion release rate of the iron sacrificial electrode is enhanced, and generation of a passive layer is reduced to maintain the reactivity of the electrode.

Other objectives, advantages, and novel features of the invention will become more apparent from the following detailed description when taken in conjunction with the accompanying drawings.

DETAILED DESCRIPTION OF THE PREFERRED EMBODIMENTS

According to a preferred embodiment of the present invention, an iron sacrificial electrode undergoes a surface treatment process, which is a combination of physical, chemical and electrochemical processes, to form a plurality of micro pores with a high density that are evenly disposed on the electrode surface. Furthermore, an ion implantation process is performed to implant chlorine ions into the pores. When the electrode is connected to a power source, the chlorine ions in the pores act as a catalytic agent that generates a chain catalytic reaction, which accelerates the corrosion rate of the iron sacrificial electrode, enhances a release rate of iron ions from the iron electrode, and avoids generation of a passive layer.

Figure 1:
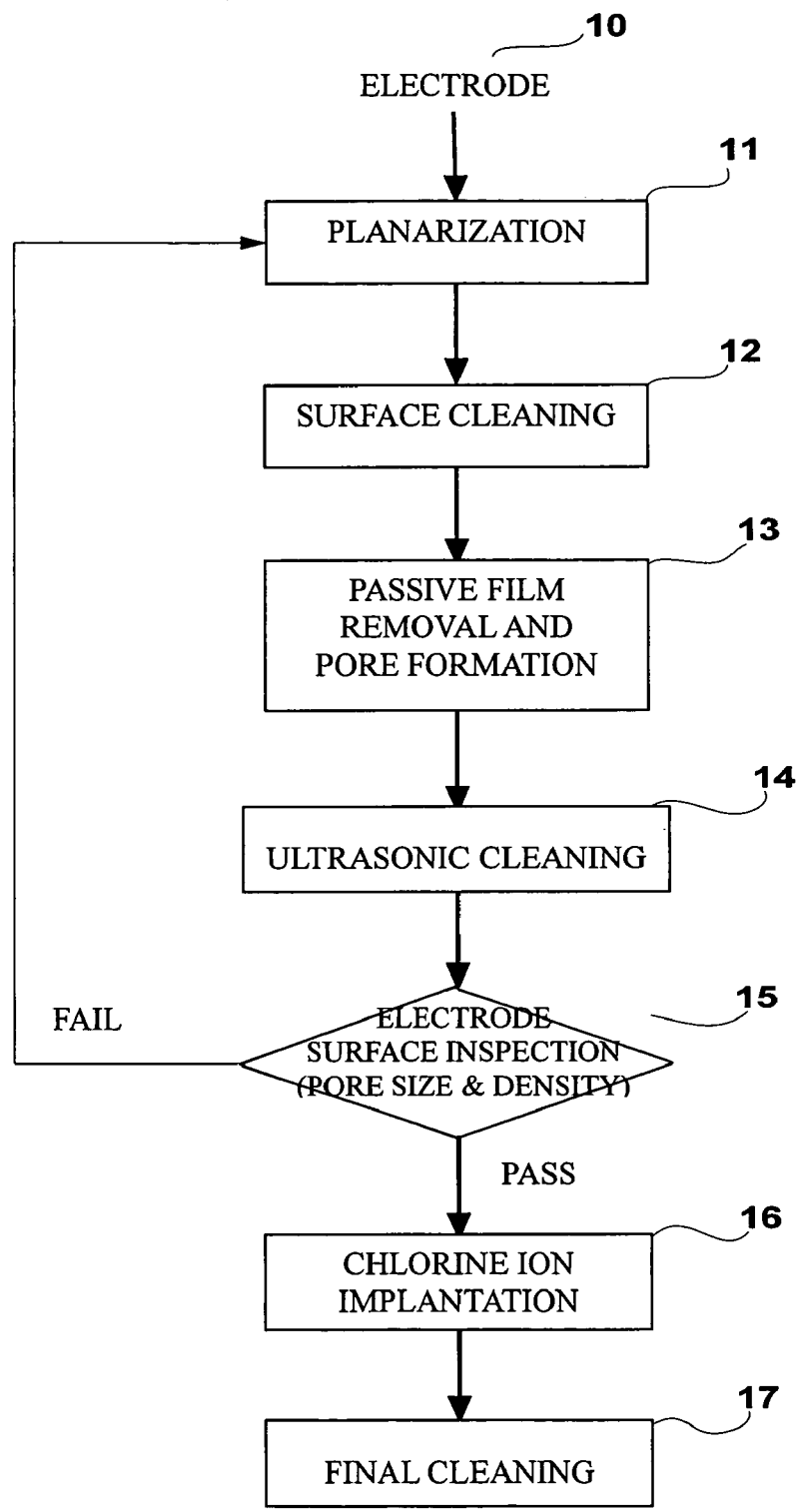
FIG. 1 is a flow chart of an iron electrode surface treatment according to a preferred embodiment of the present invention.

Please refer to FIG. 1. FIG. 1 is a flow chart of an iron electrode surface treatment process according to a preferred embodiment of the present invention. The surface treatment process is described in the following.

An iron electrode 10 is subjected to an electrode surface planarization process 11. The planarization process 11 employs a physical method to improve the planarization of the electrode surface. This physical method comprises a mechanical grinding and a surface polishing. The surface planarization process 11 helps a following pore formation process 13 to obtain a better pore distribution.

Next, the electrode is subjected to a cleaning process 12 to remove any remaining particles after the planarization process 11. Then, an pore formation process 13 is used to remove any passive layer generated on the electrode surface, and to perform an electrochemical etching process that generates a plurality of pores with a high density distribution on the electrode surface. In order to obtain a good pore distribution, the pore formation process 13 immerses the electrode in an acid solution with a particular concentration, and controls certain factors such as the immersion time, the pH value, and an applied voltage to achieve a pitting effect. In order to prevent the electrode from being etching by any residual acid solution, which would damage the pores, an ultrasonic cleaning process 14 is used to clean the electrode and remove the remaining acid solution. Moreover, a pore density inspection process 15 is performed on the electrode surface, which employs a high-multiple light reflection microscope, to check the number of pores per unit area; this value should be at least $10^4$ pores/cm$^2$. If the pore density distribution is less than the $10^4$ pores/cm$^2$, the planarization process 11 is performed again, and the process parameters in the pore formation process 13 are adjusted; if the pore density distribution is not lower than the $10^4$ pores/cm$^2$, a chlorine ion implantation process 16 is performed.

For the chlorine ion implantation process 16, the electrode is placed into a high concentration chlorine ion solution, and a trace of direct voltage is applied to the electrode. Due to diffusion caused by a concentration difference, and an attraction between positive and negative charges, the chlorine ions are implanted into the electrode and remain in the pores on the electrode. Finally, a final cleaning process 17 is performed to rinse off the remaining chlorine ion solution on the electrode surface.

Figure 2:
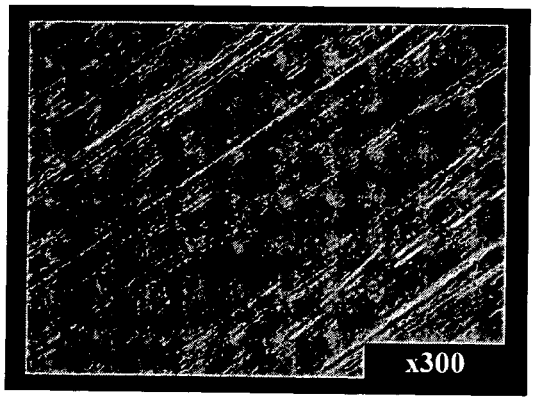
FIG. 2 is an optical microscope (OM) photo of an iron electrode surface after a surface planarization process.

Embodiment:

A columnar iron electrode 1 was ground by way of a grinder, and polished with fine sand paper, as shown in FIG. 2.

The cleaning process 12 used water to rinse the electrode surface. Then, the electrode was removed from the cleaning process 12 and placed into a reaction tank 2, as shown in FIG. 3, to perform the pore formation process 13.

The reaction tank 2 for the pore formation process 13 was made from a stainless steel material, and held a 3 M HCl solution 3. The electrode 1 was placed in the tank and immersed in the acid solution 3; the cathode of a direct current power supply 4 was connected to the electrode 1, and the anode of the power supply 4 was connected to the reaction tank 2. The power supply 4 provided 10~30 volts for about 5 minutes.

Figure 4:
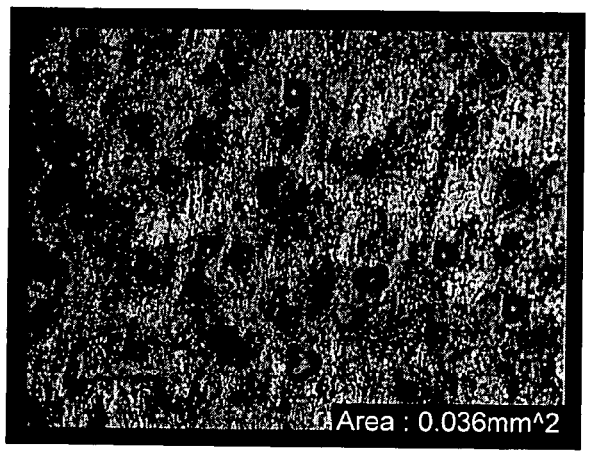
FIG. 4 is an optical microscope (OM) photo of an iron electrode surface after a surface pore formation process.

Next, the electrode 1 was taken out of the reaction tank 2 and placed into an ultrasonic oscillation water tank to undergo oscillation for about a minute to accomplish the cleaning process 14. The pore density inspection process 15 was performed on the electrode surface 1, which employed a high-multiple light reflection microscope to check the number of pores per unit area on the electrode surface 1. The measurement result shows that there are $8 \times 10^4$ per pores/cm$^2$ (as shown in FIG. 4), with a pore diameter of about 13 µm.

Figure 3:
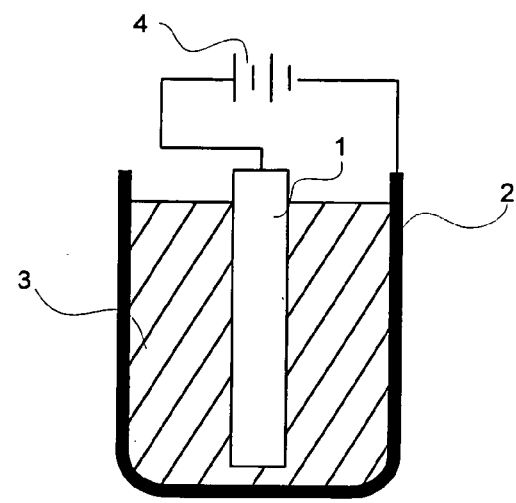
FIG. 3 is a schematic drawing of an electrochemical reactor employed in the present invention.

The chlorine ion implantation process 16 was performed on the electrode 1 and employed the same type of reaction tank 2 as shown in FIG. 3; the solution 3 was changed to a 10% sodium chloride solution; 0.4 volts were applied to the electrode 1 for 15 minutes. Finally, the electrode 1 was removed from the reaction tank and rinsed with deionized water to wash off any of the remaining sodium chloride solution 3.

Figure 5:
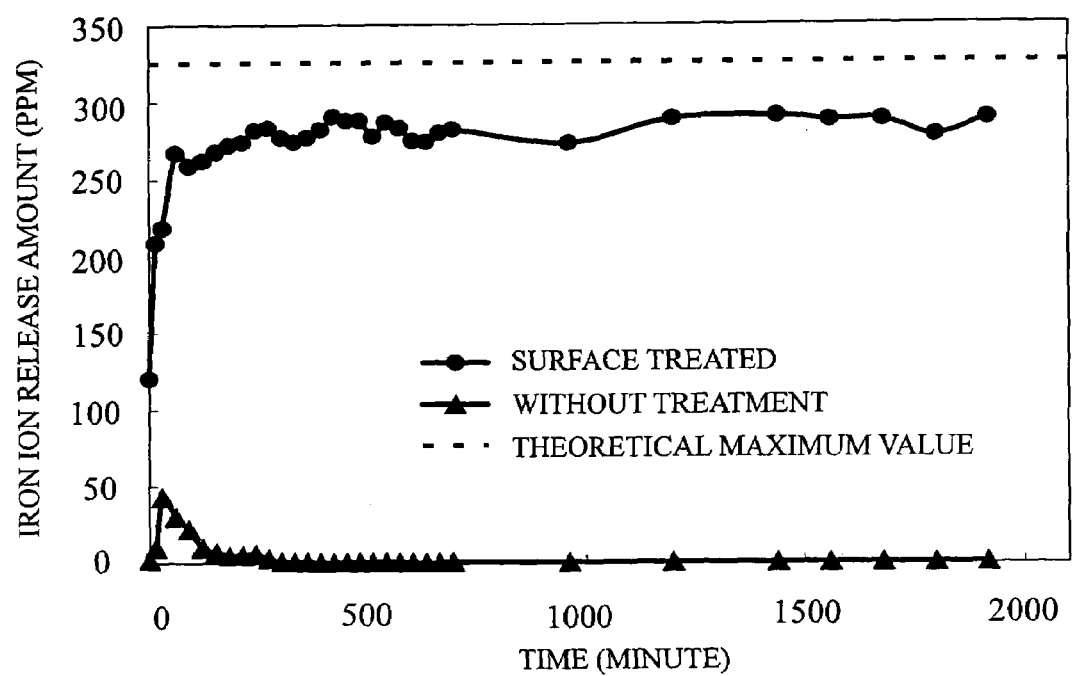
FIG. 5 is a drawing of an iron ion ppm change (iron ion release amount) with time (min) in an electro-coagulation process for waste water from a semiconductor chemical mechanical polishing process.

Please refer to FIG. 5. FIG. 5 is a drawing of an iron ion ppm change (iron ion release amount) with time (in minutes) in an electro-coagulation process for the waste water from a semiconductor chemical mechanical polishing process. This experiment was preformed by placing the electrode in the wastewater from a chemical mechanical polishing process, and applying 100 volts to the electrodes. As shown in FIG. 5, after the present invention surface treatment, the release rate of iron ions from iron electrode 1 is enhanced, and no passive layer is formed, which provides for a longer lifetime than an electrode that has not undergone the present invention process.

Although the present invention has been explained in relation to its preferred embodiment, it is to be understood that many other possible modifications and variations can be made without departing from the spirit and scope of the invention as hereinafter claimed.

What is claimed is:

1. A surface treatment process for enhancing a release rate of metal ions from a sacrificial electrode, the process comprising:
    a) performing a surface pore formation process to form a high density distribution of micro pores on a surface of a metal electrode, wherein the metal electrode is an iron, aluminum or copper electrode; and
    b) implanting chlorine, bromine or iodine ions in the micro pores of the metal electrode.

2. The method as claimed in claim 1, wherein the metal electrode is an iron electrode.

3. The method as claimed in claim 2, wherein in step b) chlorine ions are implanted into the micro pores.

4. The method as claimed in claim 2, wherein the micro pores have openings smaller than 20 microns, and a density distribution of at least $10^4$ pores per square centimeter.

5. The method as claimed in claim 3, wherein step b) comprises immersing the electrode with pores formed in step a) into a solution containing chlorine ions.

6. The method as claimed in claim 3, wherein step b) comprises immersing the electrode with pores formed in step a) into a solution containing chlorine ions, and connecting the electrode to a cathode of a DC power source, and connecting a working electrode immersed in the solution to an anode of the DC power source.

7. The method as claimed in claim 6, wherein the solution containing chlorine ions is a solution of sodium chloride, potassium chloride or ammonium chloride.

8. The method as claimed in claim 3, wherein the chlorine ion implantation is performed by a physical method.

9. The method as claimed in claim 8, wherein step b) comprises exposing the electrode with pores formed in step a) to chlorine or to a gas containing chlorine ions.

10. The method as claimed in claim 3, wherein the surface pore formation process comprises a chemical etching process.

11. The method as claimed in claim 10, wherein the chemical etching process comprises immersing the metal electrode in a strong acid solution.

12. The method as claimed in claim 11, wherein the chemical etching process comprises connecting the electrode to a cathode of a DC power source, and connecting a working electrode immersed in the strong acid solution to an anode of the DC power source.

13. The method as claimed in claim 12, wherein the strong acid solution is 0.1–6 M hydrochloric acid solution or a sulfuric acid solution.

14. The method as claimed in claim 13, wherein the strong acid solution is a 3 M hydrochloric acid solution.

15. The method as claimed in claim 12, wherein the DC power source has a voltage of 1 to 50 volts between the cathode and the anode.

16. The method as claimed in claim 3, wherein the surfacepore formation process comprises a physical etching process.

17. The method as claimed in claim 16, wherein the physical etching process comprises a plasma etching process.

18. The method as claimed in claim 1 further comprising: performing a planarization process on the metal electrode before step a), the planarization process improving a surface planarity of the electrode; and rinsing particles remaining on the electrode surface after the planarization process.

19. An iron sacrificial electrode comprising:
an electrode surface;
a plurality of pores disposed on the electrode surface; and
chlorine ions implanted in the plurality of pores;
wherein the pores have openings that are less than 20 microns in size, and the pores have a density distribution of at least $10^4$ pores per square centimeter.

* * * * *